March 5, 1940.   R. LEE   2,192,709
ELECTRIC CURRENT CONVERTER
Filed March 18, 1937

WITNESSES
L. E. Kilian
C. L. Naal

INVENTOR
Royal Lee
By R. S. Caldwell
ATTORNEY

Patented Mar. 5, 1940

2,192,709

UNITED STATES PATENT OFFICE 2,192,709

ELECTRIC CURRENT CONVERTER

Royal Lee, Milwaukee, Wis., assignor to Lee Engineering Research Corporation, Milwaukee, Wis., a corporation of Wisconsin Application March 18, 1937, Serial No. 131,619

7 Claims. (Cl. 175—364)

The invention relates to electric current converting systems and apparatus.

In some types of current rectifiers and inverters use is made of a rotary commutator having brushes bearing thereon. When the brushes are carrying current at the instant they break contact with the commutator segments arcing or sparking will occur, thereby causing wear and depreciation of the commutator and brushes. Certain other types of converters make use of commutating devices with vibrating contacts. In many instances these contacts are required to break direct current, which is destructive to contact surfaces.

An object of the invention is to provide an electric current converting system having circuit interrupting means for protecting a commutating device in the system and for adjusting the point of current cut-off and also the point of current starting.

Another object of the invention is to provide means for varying the point of current cut-off and the point of current starting while the system is in operation.

A further object is to connect the circuit interrupting means in the alternating current portion of the system to insure long life for the contacts of the interrupting means.

The invention further consists in the several features hereinafter described and claimed.

Figure 1:
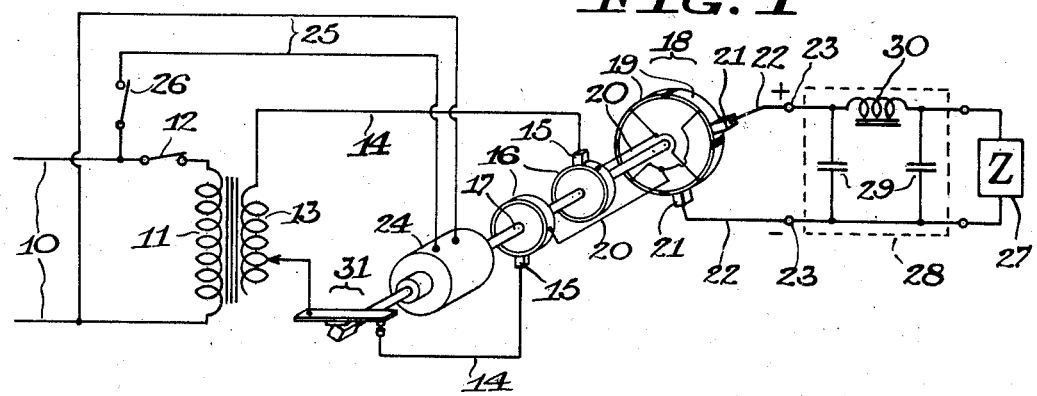
Figure 2:
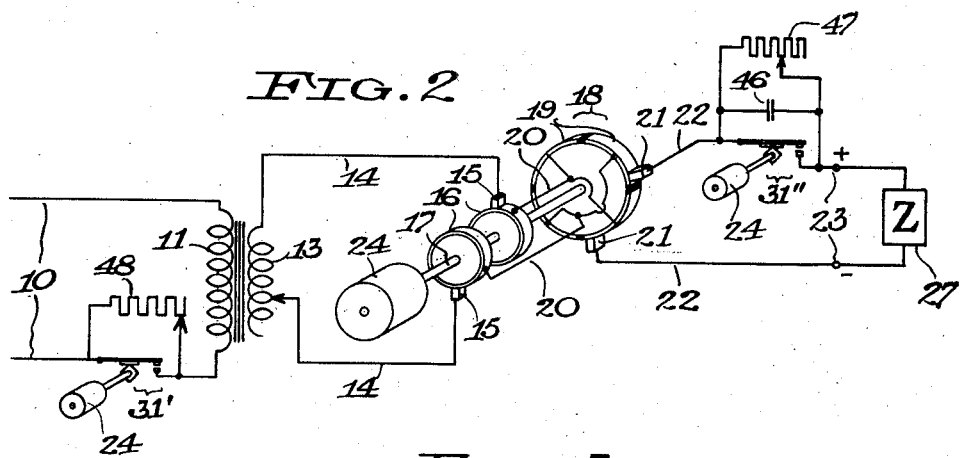
Figure 3:
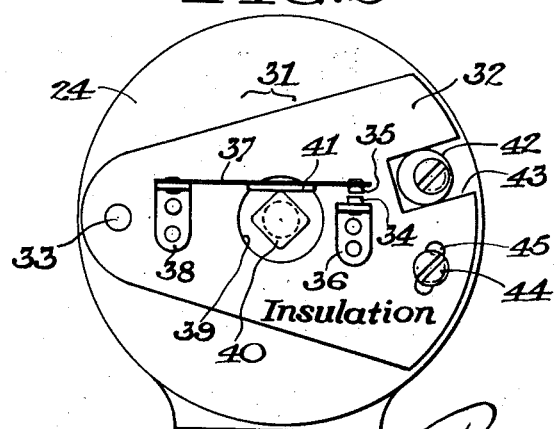

Certain embodiments of the invention are illustrated in the accompanying drawing, wherein Fig. 1 is a schematic wiring diagram of a current converting system arranged in accordance with the invention;

Fig. 2 is a schematic wiring diagram of another form of current-converting system, and Fig. 3 is a view of a circuit interrupter.

By way of illustration the current converting system shown in Fig. 1 is one for effecting full-wave current rectification and having a commutating device of the rotary type. Alternating current mains 10 are connected to the primary winding 11 of a variable ratio transformer, one of the mains having a switch 12. The secondary winding 13 of the transformer is connected by leads 14 to brushes 15 bearing on respective slip rings 16 mounted on a rotary shaft 17. The shaft also carries a commutator 18, the appropriate segments 19 of which are connected to the slip rings by conductors 20. The commutator is here shown to have four segments, opposite ones of which are connected together, but it will be understood that the number of segments will depend on the speed of the shaft. Output brushes 21, spaced 90° apart, bear on adjacent commutator segments and are connected by leads 22 to the output terminals 23 of the system. The shaft 17 forms the rotor shaft of a self-starting synchronous motor 24 which is connected to the mains 10 by leads 25, one of these leads having a switch 26.

A load 27 is connected to the direct current output terminals of the system, in some cases through an intervening filter 28, here shown to have shunt condensers 29 and a series inductor 30. The load may be a pure resistance or may be a device such as a storage battery, which exerts a counter-electromotive force. For battery charging the filter may ordinarily be omitted.

In order to protect the commutator and its brushes from sparking or arcing the system is provided with a circuit interrupter, designated generally by 31, which opens the circuit through the commutator in the intervals in which the commutator segments pass from one brush to the other and before the segments leave the brushes, so that no current is broken at the commutator. The interrupter is also used to vary the points of current starting and cut-off, which feature is advantageous when the load imposes a counter-electromotive force. The interrupter forms a master control, thus providing for simple and accurate adjustment. In the system shown in Fig. 1 the interrupter 31 is connected in the alternating current portion of the circuit, and particularly in one of the leads 14 between the transformer secondary 13 and the slip rings 16. By placing the interrupter in the alternating current portion of the circuit, the contacts of the interrupter will have a relatively long life, and will not be subject to coning or building-up, since alternating current, instead of unidirectional current, will flow through the contacts.

One suitable form of interrupter is shown in Fig. 3, wherein a supporting plate or arm 32 of insulating material is mounted on a pivot 33 on an end of the motor 24 and carries a fixed contact 34 and a movable contact 35. The contact 34 is mounted on a bracket 36 anchored on the plate, and the contact 35 is mounted on the free end of a leaf spring 37, the other end of which is secured to a bracket 38 anchored on the plate. The contacts are formed of tungsten or other resistant metal. The plate 32 has an opening 39 receiving therethrough a four-lobed cam 40 which is carried on the end of the motor shaft 17. The cam bears on an insulating shoe 41 secured to the leaf spring 37 and serves to oscillate or vibrate the spring. To adjust the amplitude of movement of the contact 35 and therefore the time interval between the opening and closing of the contacts, the plate 32 is angularly displaceable on its pivot 33 by a rotatable cam or eccentric 42 fitting in an opening or slot 43 formed in the plate, the plate being locked in adjusted position by a screw 44 passing through a slot 45 in the plate. This construction permits the interrupter to be readily and accurately adjusted while the motor is in operation. At the best operating adjustment little or no sparking will occur at the interrupter. The range of adjustment of the interrupter may be such as to permit the contacts to be continuously closed or continuously open. Since the opening and closing of the circuit is determined by the interrupter, exact spacing and positioning of the ends of commutator segments is not necessary.

In operation, the synchronous motor 24 is placed in operation by closing the switch 26, and after the motor attains its synchronous speed the switch 12 is closed, permitting alternating current to flow from the transformer to the slip rings 16 and commutator 18, the latter converting the current to direct current which flows through the filter 28 and load 27. When the filter is used the pulsating voltage across the terminals 23 does not fall to zero, and the same is true when a battery is being charged. The interrupter 31 operates twice during each alternating current cycle for interrupting the successive positive and negative current alternations, and is adjusted so that the opening and closing of the secondary circuit take place essentially at the contacts of the interrupter instead of at the commutator segments 19 and brushes 21, thus minimizing wear and deterioration of the commutator and its brushes. The interrupter can readily be adjusted while the motor is running to obtain a condition of minimum sparking or arcing. This adjustment varies the point of commutator cut-off. By varying the secondary voltage of the transformer the output of the rectifier may be adjusted. Within certain limits the variation of the secondary voltage of the transformer can also be used to obtain the optimum operating condition.

In that form of rectifying system shown in Fig. 2, an interrupter 31′, similar to the interrupter 31, is placed in the primary circuit of the transformer, and a similar interrupter 31″ is placed in one of the direct current output leads 22. These interrupters may be used conjointly or alternatively. For facility in illustration, the interrupters 31′ and 31″ and the commutator 18 are shown to be driven by separate synchronous motors 24, but it will be understood that only one motor is required.

Since the interrupter 31″ is traversed by direct current, it is necessary or desirable to provide protective means therefor, here exemplified by a condenser 46 connected across the contacts of the interrupter. A variable resistance or impedance 47 may be connected across the contacts to pass a part of the output current, the value of the resistance being sufficiently high to adequately limit any reverse current that may flow. A similar resistance or impedance 48 is here shown to be connected across the contacts of the interrupter 31. In some instances either or both of these resistances may be open-circuited or disconnected.

The operation of the system of Fig. 2 is substantially the same as that of Fig. 1. The interrupter 31′, being in the primary circuit of the step-down transformer, is required to handle only a relatively small current. When the interrupters 31′ and 31″ are used conjointly, the interrupter 31″ may be set to open slightly later than the interrupter 31′ so that it will be required to break little or no current. The interrupter 31″, however, will prevent or limit the flow of back current, if a counter-electromotive force is present in the load circuit.

While the interrupter 31 of the system of Fig. 1 is shown to completely interrupt a circuit, in some cases it may be shunted by a current limiting impedance in the manner of the interrupter 31′ of the system of Fig. 2.

What I claim as new and desire to secure by Letters Patent is:

1. In a current converting system, the combination of a circuit having an alternating current portion and including a commutating device, and an interrupter in said alternating current portion operable during each current alternation to protect said commutating device from sparking, said interrupter having relatively movable, cooperating solid contacts.

2. In a current converting system, the combination of a circuit having an alternating current portion and a direct current portion and including a commutating device, and an interrupter in said alternating current portion having relatively movable, cooperating solid contacts to determine the point of current cut-off for the commutating device during each current alternation.

3. In a current converting system, the combination of a circuit having an alternating current portion and a direct current portion and including a commutating device, and an interrupter in said alternating current portion having relatively reciprocatory, cooperating solid contacts and adjusting means therefor to vary the point of current cut-off for the commutating device, said interrupter being operable during each current alternation.

4. In a current converting system, the combination of a circuit including a commutating device, said circuit having an alternating current portion in which both positive and negative current alternations flow, and an interrupter in said alternating current portion of said circuit to protect said commutating device from sparking, said interrupter being operable during each current alternation.

5. In a current converting system, the combination of a circuit including a commutating device, said circuit having an alternating current portion and a direct current portion, an interrupter in said alternating current portion of said circuit to operate during each current alternation and to protect said commutating device from sparking, and an interrupter in said direct current portion of said circuit to minimize flow of back current.

6. In a current rectifying system, the combination of a circuit including a full wave commutating device forming a rectifier, said circuit having an alternating current supply portion and a direct current output portion, and an interrupter in said alternating current supply portion operable during each current alternation to determine the point of current cut-off for the commutating device.

7. In a current rectifying system, the combination of a circuit including a commutating device, said circuit having an alternating current supply portion and a direct current output portion, said supply portion having a step-down transformer with primary and secondary windings, and an interrupter in circuit with said primary winding to determine the point of current cut-off for the commutating device.

ROYAL LEE.